(12) United States Patent
Frumau et al.

(10) Patent No.: US 7,182,212 B2
(45) Date of Patent: Feb. 27, 2007

(54) FLOATING LIFTING DEVICE

(75) Inventors: Christiaan Frumau, Delft (NL); Wilhelmus Coenradus Johannes Joephus Woldring, Rotterdam (NL); Johan Albert Commandeur, Zwijndrecht (NL)

(73) Assignee: IHC Gusto Engineering B.V. (NL)

( * ) Notice: Subject to any disclaimer, the term of this patent is extended or adjusted under 35 U.S.C. 154(b) by 0 days.

(21) Appl. No.: 10/898,535

(22) Filed: Jul. 23, 2004

(65) Prior Publication Data

US 2005/0109724 A1    May 26, 2005

Related U.S. Application Data

(63) Continuation of application No. PCT/NL03/00054, filed on Jan. 27, 2003.

(30) Foreign Application Priority Data

Jan. 25, 2002    (EP) .................................. 02075311

(51) Int. Cl.
*B66D 1/08* (2006.01)
(52) U.S. Cl. ................... 212/307; 254/228; 254/254
(58) Field of Classification Search ............... 212/307; 254/228, 254, 264
See application file for complete search history.

(56) References Cited

U.S. PATENT DOCUMENTS

| | | | |
|---|---|---|---|
| 1,703,777 A * | 2/1929 | Pernot ...................... 242/419.4 |
| 2,924,328 A * | 2/1960 | Lidderdale .................. 226/176 |
| 2,986,889 A * | 6/1961 | Ludwig ....................... 405/224 |
| 3,499,629 A * | 3/1970 | Horton ....................... 254/93 R |
| 3,602,413 A   | 8/1971 | Reynard et al. ............. 226/115 |
| 3,724,567 A * | 4/1973 | Smitherman ................. 175/203 |
| 4,093,042 A * | 6/1978 | Pradon ......................... 188/67 |
| 4,191,300 A * | 3/1980 | Beghi et al. ................. 212/242 |
| 4,446,807 A * | 5/1984 | Johnson et al. ......... 114/230.23 |
| 4,447,013 A   | 5/1984 | Sandered et al. ............. 242/54 |
| 4,734,961 A * | 4/1988 | Guthmann .................. 24/122.6 |
| 5,199,659 A   | 4/1993 | Zibilich, Jr. ................. 242/54 |
| 5,823,712 A * | 10/1998 | Kalkman et al. ........... 405/165 |
| 6,044,786 A * | 4/2000 | Dudley et al. ............... 114/242 |
| 6,070,857 A * | 6/2000 | Dragsund et al. ... 254/134.3 SC |
| 6,378,614 B1 * | 4/2002 | Adams et al. ............... 166/382 |

FOREIGN PATENT DOCUMENTS

| | | |
|---|---|---|
| EP | 0657670 A2 | 6/1995 |
| EP | 1 406 006 B1 | 10/2003 |
| FR | 2717148 | 5/1994 |
| GB | 2302076 | 1/1997 |
| WO | WO 01/48410 A1 | 7/2001 |

OTHER PUBLICATIONS

International Search Report for PCT/NL03/00054.

* cited by examiner

*Primary Examiner*—Thomas J. Brahan
(74) *Attorney, Agent, or Firm*—Greenberg Traurig, LLP (57) ABSTRACT

The invention relates to a floating lifting device, using two movable lifting structures (13, 14) which can be alternatively engaged with broaden support members (5, 6, 7) of a cable (4). The cable (4) is stored substantially without tension in the vessel (1), for instance on a drum or in a hawse-hole (10) in a looped configuration. Large loads (9) can be lowered and raised from the seabed at large water depths such as at 3000 m. Preferably, the cable is formed by neutral buoyancy material, such as synthetic cable.

7 Claims, 8 Drawing Sheets

FLOATING LIFTING DEVICE

RELATED APPLICATIONS

The present application is a continuation of PCT/NL03/00054 filed Jan. 27, 2003, which claims priority to EP 02075311.7 filed Jan. 25, 2002, entirety of which is incorporated herein by reference.

The invention relates to a floating lifting device comprising an elongate member with a number of support members at spaced-apart locations along said elongate member, a first and a second lifting structure, each structure having a releasable engagement member for engaging with the support members on the elongate member and for carrying the elongate member by the respective lifting structure, at least one lifting structure being movable in the length direction of the elongate member between an upstream and a downstream position, the elongate member being lowered or raised by repeating steps a–d:

a. moving the first lifting structure upstream or downstream, while the engagement member of the first lifting structure is closed and the engagement member of the second lifting structure is opened, such that the elongate member is suspended from the first lifting structure,
b. closing the engagement member of the second lifting structure, and opening the engagement member of the first lifting structure, such that the elongate member is supported from the second lifting structure,
c. moving the first lifting structure back towards or away from the second lifting structure, and
d. closing the engagement member of the first lifting structure and opening the engagement member of the second lifting structure.

Such a floating lifting device in the form of a J-lay pipe-laying vessel is known from European patent application EP-A-0.657.670. In this patent application a subsea pipeline is lowered to the seabed along a vertical tower, comprising a travel block movable along said tower. The pipeline comprises along its length collars, which can be engaged by the movable travel block, which can be opened and closed and can lower the pipes to a position in which they rest with a collar on a pedestal, whereafter the travel block can be disengaged and return. A new pipe section is added to the pipeline and the pipeline is again lowered via the travel block towards the seabed.

It is an object of the present invention to provide a lifting structure with which a variety of heavy objects can be raised from and lowered towards the seabed.

It is a further object of the present invention to provide a floating lifting device for lifting heavy subsea equipment and structures, such as templates, wellheads and the like in large water depths, i.e. water depths over 1000 m.

It is a further object of the present invention to provide a relatively simple lifting device which may reduce costs of for instance an abandonment and recovery system of a pipe-lay vessel and which consumes relatively little space.

Thereto, the floating lifting device of the present invention is characterised in that the elongate member is a flexible line comprising at an end part a connector for releasably attaching objects to the end of said line, the lifting device comprising a line storage member from which during carrying out steps a–d, the line is supplied without being tensioned.

With the lifting device of the present invention it is possible to use a flexible line or cable for lifting and lowering heavy objects, which line can be stored without significant tension on the vessel. In contrast, lifting winches using steel cable are known, which cable is stored on a drum and runs along a traction winch in several loops for reducing the tension on the cable at the drum. The tensioned cable on the drum causes a frictional corrosion and consequent damage of the cable.

Furthermore, steel cables are less effective at water depths larger than 1500 m as the weight of the cable becomes prohibitive and the amount of space consumed by the stored cable on the drum is particularly large. The use of synthetic cables, stored on a known winch, is unfavorable in view of slippage and consequent frictional damage to the cables, such as the possibility of the outer cable jacket being burned or melting.

With the present invention, the non-used part of the cable can be stored in a non-tensioned manner on the vessel. This means that a synthetic cable can be used, stored on a drum or stored in a looped configuration in a box-shaped compartment (hawse-hole) of the vessel. Alternatively, separate cable sections may be stored on the vessel in a straight-line configuration, the cable sections being interconnected at the moment of use. Hereby, a very flexible system, which can accommodate different water depths, is obtained. If sufficient cable strength is not available for lifting or lowering a specific object, even looped cable sections can be employed in the method of the present invention to obtain sufficient cable strength. The present invention allows the use of a very long synthetic cable of 1000 m or longer, preferably 1500 m or longer, which might be formed by interconnected synthetic cable segments. It is even possible to combine a standard steel cable in strings with synthetic cable strings.

The present lifting device may be employed as an abandonment and recovery system in a J-laying vessel, which is used to abandon the pipeline to the seabed and to recover it afterwards for instance in case of severe weather conditions. Regularly employed abandonment and recovery systems use a double capstan winch for reconnecting the pipeline to the J-lay tower. By use of the flexible line of the present invention, a simple abandonment and recovery construction is obtained which may employ the lifting force of the J-lay tower. Hereby, it is no longer necessary to employ an additional winch as a abandonment and recovery system, such that large cost saving is obtained and extra space on the vessel is made available. A double capstan winch suitable for a water depth of 3000 m including the required steel cable, is very heavy and bulky. Such a conventional abandonment and recovery system would double the weight of a conventional J-lay system, which can be prevented by use of the lifting device of the present invention.

Alternatively, the lifting device of the present invention is not employed in combination with pipe laying, but for installation of other heavy subsea equipment and structures such as templates, wellheads etc. at large water depths. The lifting structures may form an assembly, which is suspended from a crane.

In one embodiment, the lifting line is stored in a looped configuration. In case the line is formed of synthetic cable, the cable can be placed in a conventional hawser compartment in a looped configuration. The synthetic cable has substantially neutral buoyancy, such that the full capacity of the lifting device can be used for raising and lowering of the load.

In an alternative embodiment, separate line segments are employed, which are added successively as the weight is lowered or are removed when the weight is raised. The line segments may be stored on deck or below deck in a hawser compartment or other suitable tension less storing configurations. The cable sections may be interconnected by members such as shackles, which at the same time form the support members by which the object is lifted.

In one embodiment, each cable section is provided at its end with an eye, the eyes of adjacent cables being attached by a suitable connector, such as a shackle. The interconnected broad end sections can at the same time form the support members for lifting and lowering the cable. For protecting the interconnections from being damaged, a collar might be placed around the interconnected eyes of the cable.

In a further embodiment, the support member in the cable may comprise an inner core, having along its length a number of circumferential ribs, fiber strands being placed on the core and over the ribs. An outer sleeve encloses the core, while an inner surface of the sleeve is provided with projections that are complementary to the ribs on the core and are received between the ribs of the core. The support member is maintained in its axial position by friction, which is determined by the number and depth of the circumferential ribs of the core. In this embodiment, the position of the support member along the line and number of support members can be easily adjusted upon manufacturing of the lifting line.

A suitable lifting device comprises a first lifting structure with two parallel rods, each rod telescopically received in a sleeve to be displaceable in the length direction of the line, a drive member connected to the rods for displacing the rods in the length direction, a pulley being connected at the end of each rod, a movable clamp being placed on each rod, the opposed clamps of the rods forming the first lifting structure, the clamps being connected to lifting cable running long the rod, around the pulley and downward along the rods to a point of fixation.

By this lifting device, a relatively large stroke for lowering or raising can be obtained with a relatively compact construction with a first displacement given by telescopic movement of the parallel rods and a second displacement step being possible by lowering the clamps along the sleeves.

Some embodiments of a lifting device according to the present invention will be explained in detail with reference to the accompanying drawings. In the drawings.

Figure 1:
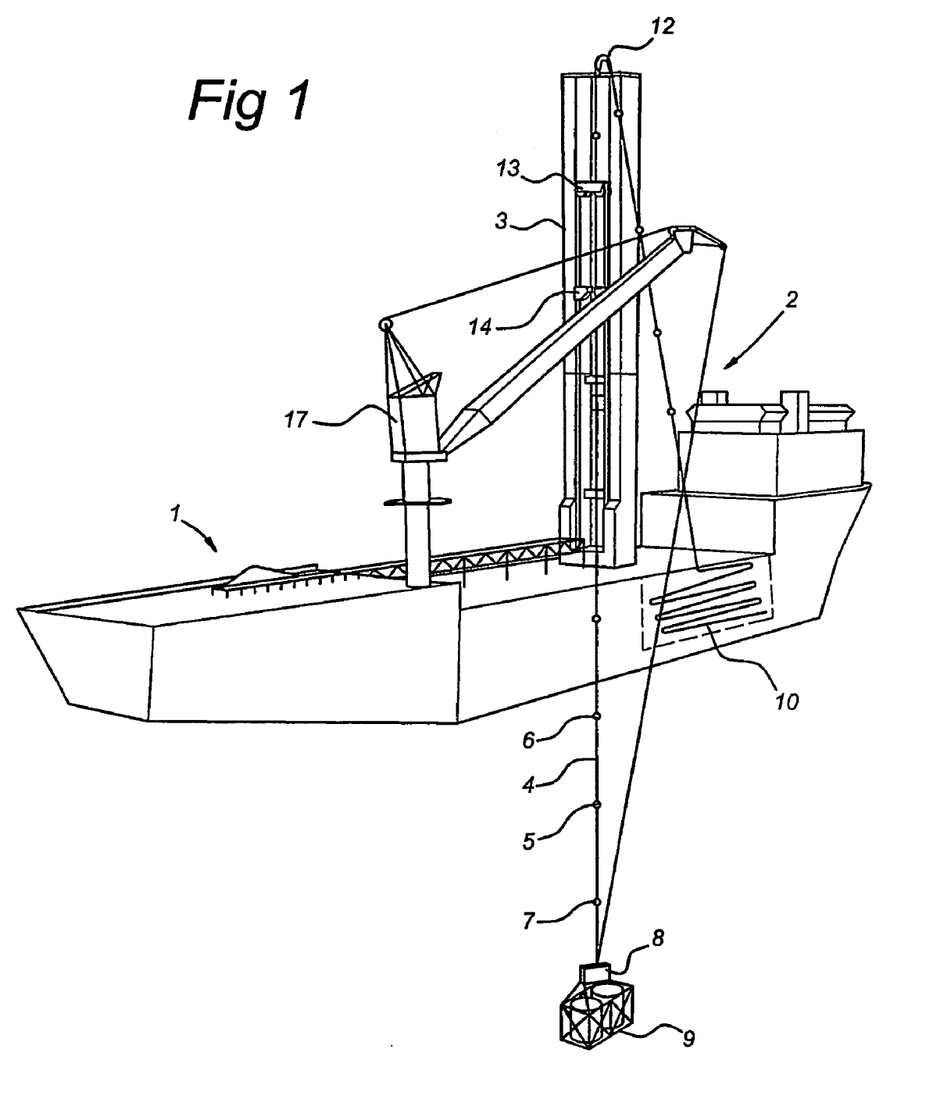
FIG. 1 shows a perspective view of a floating lifting device according to the present invention.

FIG. 1 shows a vessel 1 comprising a lifting device 2 according to the present invention. The lifting device 2 comprises a vertical frame 3 carrying a cable 4 having at spaced-depart locations support members in the form of broadened parts 5, 6, 7. At the end of the cable 6, a connector 8 is provided attached to a load 9, which is being lowered via the cable 4. The cable 4 is stored in a looped configuration in a storage compartment or hawse-hole 10, substantially without being tensioned. From the storage compartment 10, the cable 4 is guided via a sheave 12 to a first lifting structure 13 and a second lifting structure 14. The fist lifting structure can travel up and down along the vertical frame 3 and can releasably engage with the broadened parts 5, 6, 7 on the cable 4. Stationary lifting structure 14 can also engage and be disengaged with the broadened parts 5, 6, 7. By releasing upper lifting structure 14 and lowering the cable suspended from lifting structure 13, the load 9 is lowered. After lowering the broadened part clamped in the upper lifting structure 13 by a certain amount, the lower lifting structure 14 is engaged with one of the broadened parts of the cable 4, whereas the lifting structure 13 disengages from the cable and is returned to its upper position. In this way, the load 9 can be successively lowered until it reaches the seabed, which may be at the depth of over 1500 m, such as at 3000 m or more. The load 9 is prior to being lowered from lifting device 2, placed overboard by a crane 17 which is thereafter disengaged such that the load be lowered from cable 4.

As an alternative to the looped configuration, the cable 4 may also be stored in the compartment 10 in a coiled from, for instance around a conical raised bottom part of compartment 10, or be stored on a drum or, again, alternatively as separate line sections.

Figure 2:
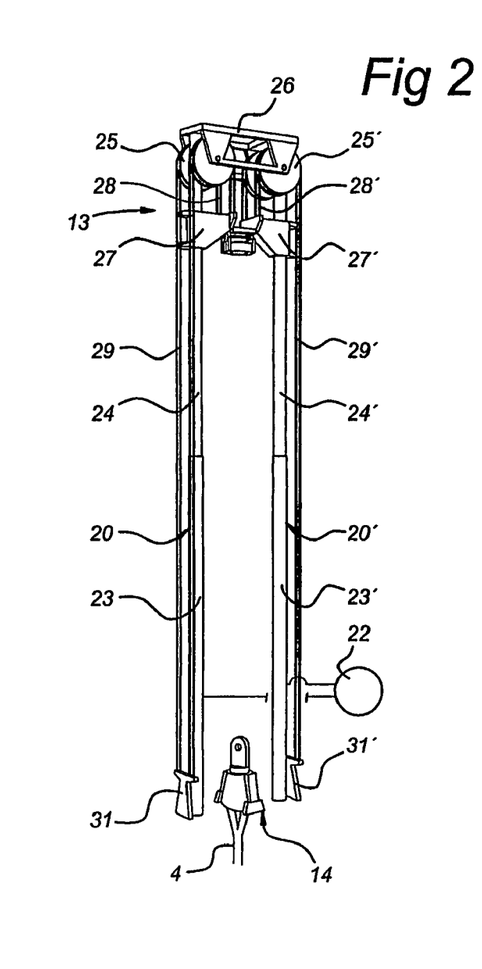
FIG. 2–4 show different stages of lowering a heavy weight with the lifting device according to the present invention.
Figure 3:
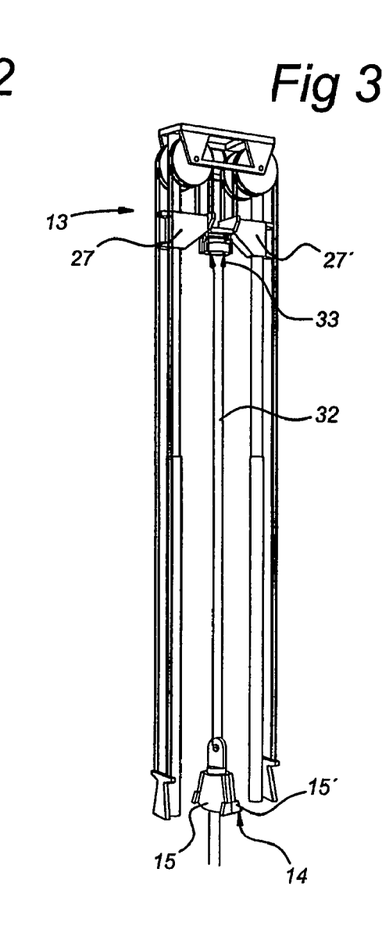
Figure 4:
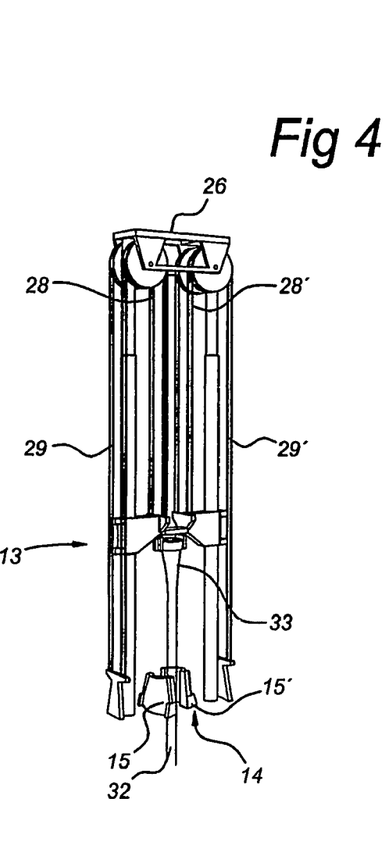

FIG. 2 show a detailed view of upper and lower lifting structures 13, 14. The upper lifting structure 13 comprises two parallel cylinders 20, 20', which are powered by hydraulic pump 22. Each cylinder comprises a sleeve 23, 23' and a rod 24, 24' moveably received within the sleeve 23, 23'. At the end of each rod 24, 24' a pulley 25, 25' is connected. Both pulleys are interconnected via a frame 26. A moveable clamp 27, 27' is slidably connected along each rod 24, 24' and along each sleeve 23, 23'. The clamps 27, 27' are connected to the end part of a cable having a first cable section 28, 28' extending from the pulley 25, 25' to the respective clamp 27, 27' and a second cable section 29, 29' extending along the rod 24, 24' and sleeve 23, 23' to a fixed position 31, 31'. As shown in FIG. 2, the lower lifting structure 14 is clampingly engaged via clamps 15, 15' with an end part of the cable 4. A cable section 32 is connected to the end part of cable 4 and is with its upper part engaged with clamps 27, 27' of upper lifting structure 13, such as shown in FIG. 3. Thereafter, the clamps 15, 15' of the lower lifting structure 14 are opened, such as shown in FIG. 4, while upper clamps 27, 27' remain engaged with the broadened part on the upper cable section 32. Under control of the hydraulic pump 22, the rods 24, 24' are under the weight of the cable 4 and load 9, pulled into sleeves 23, 23' such that the clamps 27, 27' descend along the sleeves 23, 23'. In the lowered position, the clamps 15, 15' engages with the end part 33 of cable section 32. Hereby, the whole cable weight and the weight of the load 9 is again supported from the lower lifting structure 14. The clamps 27, 27' are then disengaged and the pulleys 25, 25' are returned to their upper position as shown in FIG. 4. In an advantageous embodiment, the lifting structures 13, 14 are formed as an integral unit in a frame, which is suspended from the crane 17. In this way, heavy loads can be handled at large water depths from vessels having a standard crane by the lifting device of the present invention.

Figure 5:
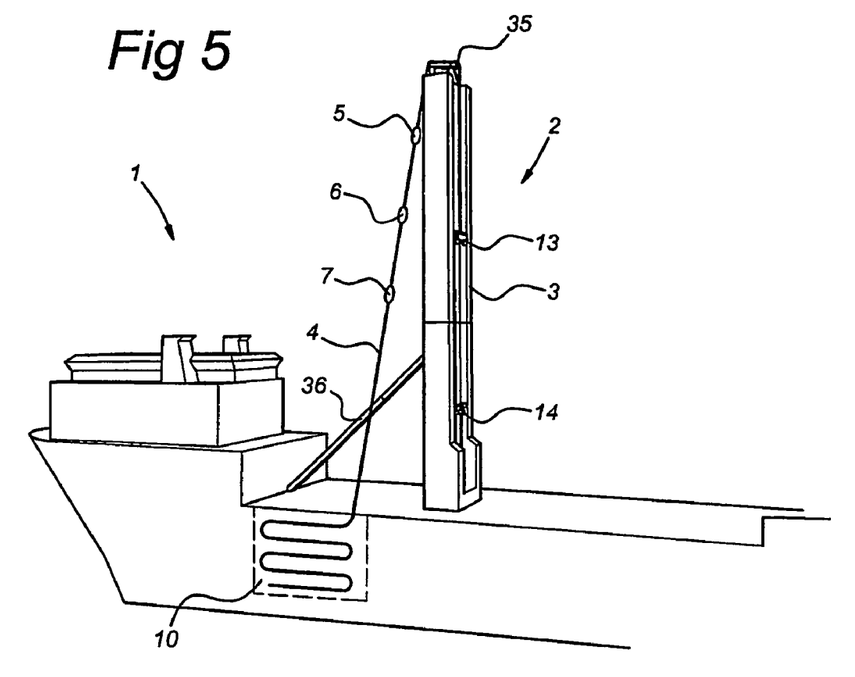
FIG. 5 shows a detail of a frame comprising a lifting device of the present invention.

FIG. 5 shows an embodiment of the lifting device 2 of the present invention in which the lifting device forms an abandonment and recovery system for retrieving a pipe system on a J-laying vessel 1. In this case, the lifting structures 13, 14 are also employed during pipe laying of the subsea pipeline. When during severe weather conditions, the pipeline needs to abandoned on the seabed at for instance 3000 m, the pipeline may upon abandonment be connected to cable 4 having the spaced apart support members 5, 6, 7 stored in compartment 10 of the vessel. The abandoned pipeline, which may have a weight of 300 T–600 T may be lifted to the surface by cable 4 by alternate operation of lifting structures 13, 14. Preferably, the support members 5, 6, 7 comprise collars having the same geometry as the collars employed on the interconnected pipe sections of the subsea pipeline, which may be a drill pipe.

Figure 6:
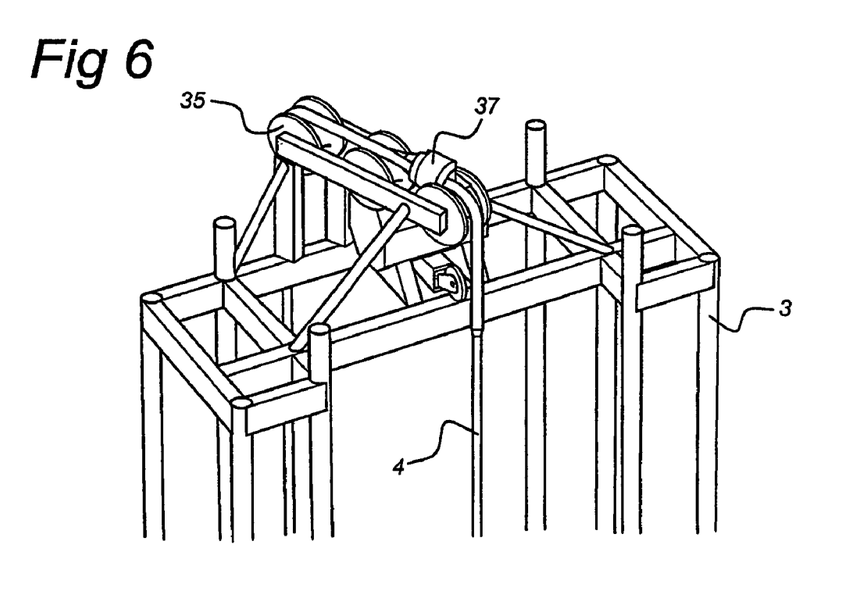
FIG. 6 shows a perspective view of a sheave guiding a lifting cable according to the present invention.
Figure 7:
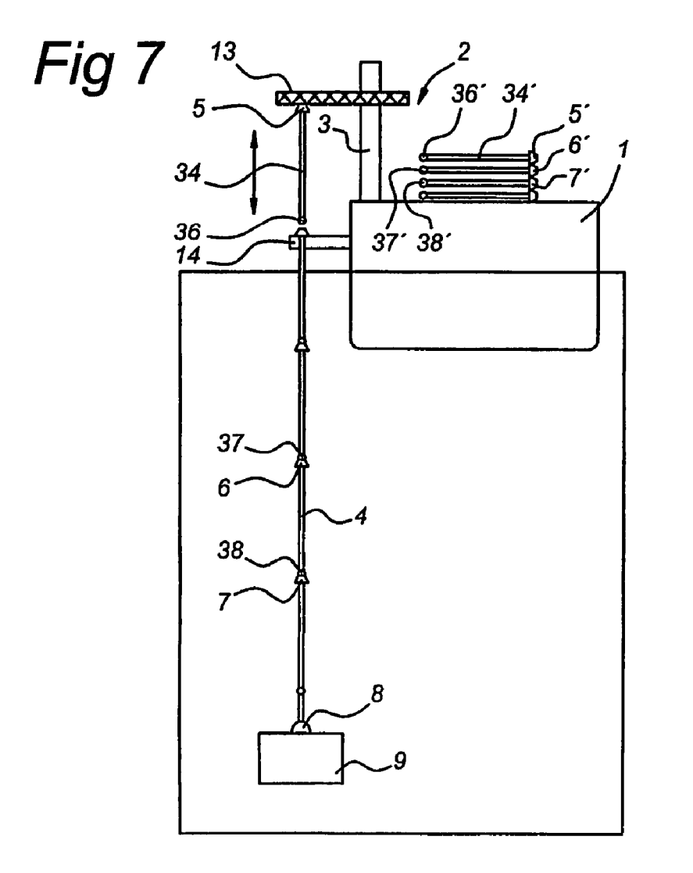
FIG. 7–10 show alternative embodiments of lifting devices of the present invention.

The cable 4 runs from the hawse-hole 10 in the hull of the vessel along the top of the J-laying frame 3 via a sheave structure 35 at the top of J-lay tower 3. There is no operational tension in the cable 4 between the sheave 35 and the hawse-hole 10. The sheave 35 is located at the centerline of the frame 3. To avoid interference between the cable 4 and tower adjuster 36, the sheave 3 is located out of the center of the tower 3. The sheaves are wide enough to allow passage of the broadened collars 37 on the cable 4.

FIG. 7–10 show different embodiments of a lifting device in which for similar elements like reference numerals have been used as in FIG. 1–6. The vessel 1 in FIG. 7 has a schematically indicated lifting device 2 with a stationary lower lifting structure 14 and upper lifting structure 13 in the form of a transverse arm moveable along vertical frame 3. The cable 4 comprises separate segments, having at their upper end a broadened support member 5, 6, 7, such as a collar, to be engaged by clamps on arms 13, 14, and at their lower end a connector 36, 37, 38 engageable with the upper end of the adjacent cable section. Each cable section 34 may have a length of for instance 12 m and can be comprised of a synthetic material having substantially neutral buoyancy in water. Cable sections 34' with support members 5'–7' and connectors 36'–38' may be stored on the deck of the vessel 1.

Figure 8:
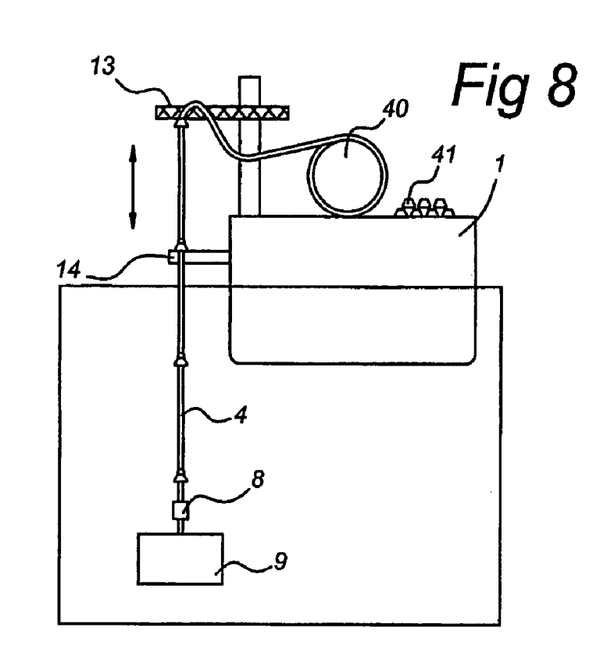

FIG. 8 shows an embodiment in which the cable 4 is a continuous cable stored on a drum 40. No substantial tension is present on the cable at the position of the drum 40. Separate support members 41 are connected to the cable each time upon stepwise lowering or raising of the load 9.

Figure 9:
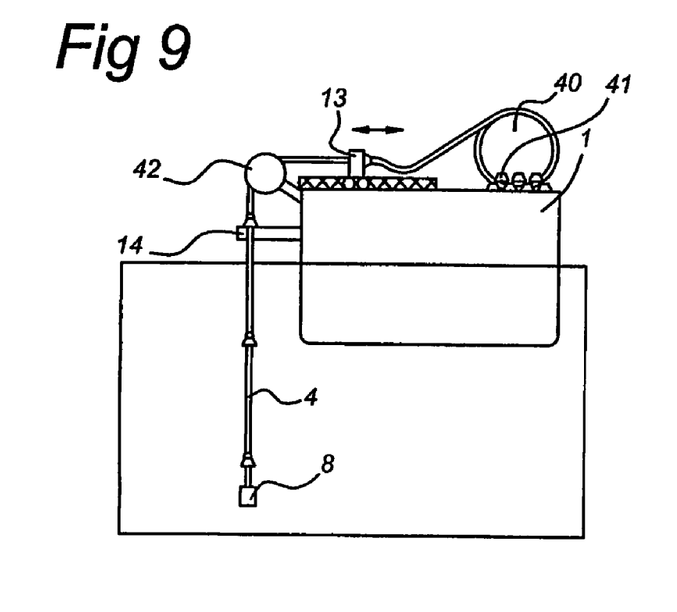

In the embodiment of FIG. 9, the upstream lifting structure 13 is displaceable in a horizontal direction along the deck of the vessel 1. The cable 4 is a continuous cable guided along a sheave 42. Separate support members 41 are connectable to the cable 4 and spaced apart intervals.

Figure 10:
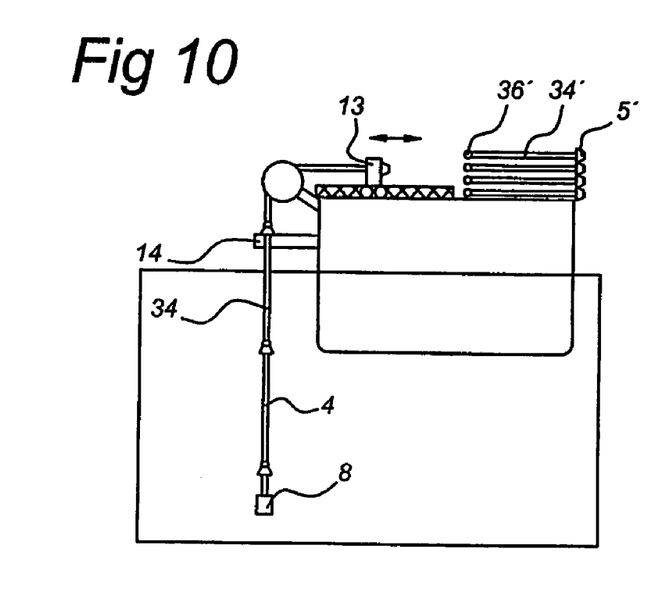

The embodiment of FIG. 10 corresponds to the embodiment of FIG. 9, but the cable 4 in this case is formed by cable sections 34, 34' having on one end part a support member 5' and on another end part a connector 36'. Again, the upstream lifting structure 13 is displaceable in a horizontal direction along the deck of the vessel 1.

Figure 11:
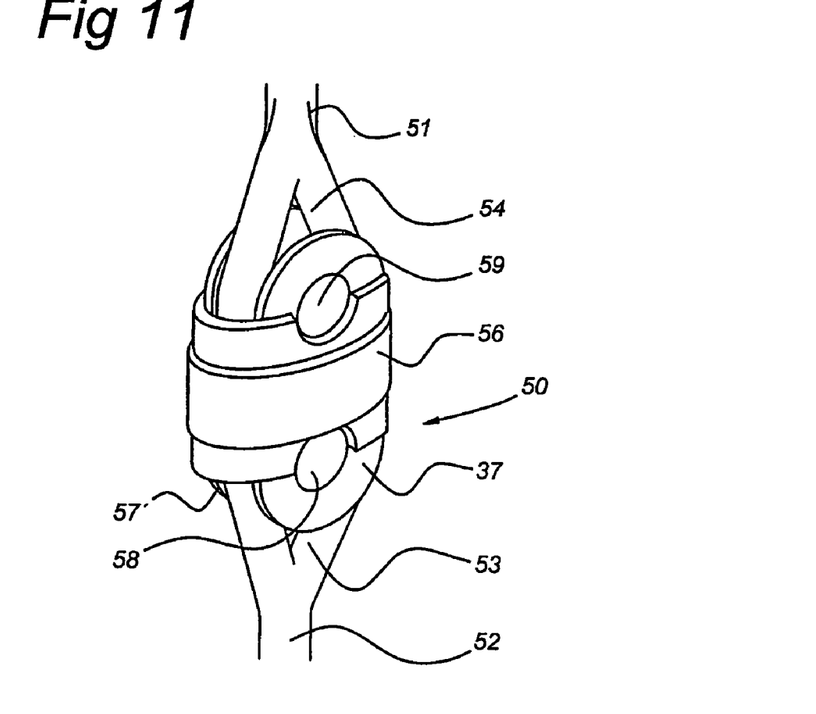
FIG. 11 shows a detail of a connecting collar for connecting two line sections.

FIG. 11 shows an embodiment of a support member 50 interconnecting two cable sections 51, 52 which are at their end parts provided with loops 53, 54. The cable sections 51, 52 may be formed of polyester or a cable material available under the trade name: Dyneema, as available from DSM, with a diameter of for instance 160 mm. Cable sections 51, 52 may also be formed of for instance Aramid fiber in a laid, plaited, braided or parallel subrope and sheath construction. The loops 53, 54 can be formed by standard splicing. The support member 50 comprises a collar 56 for engaging with the clamps on the upper and lower lifting structures 13, 14. Shackle plates 57, 57' are included through which connecting pins 58, 59 are inserted, connecting the parallel shackle plates 57, 57'. The diameter of the connecting pins 58 may for instance be 210 mm, whereas the distance between the center points of connecting pins 58, 59 may be about 330 mm.

Figure 12:
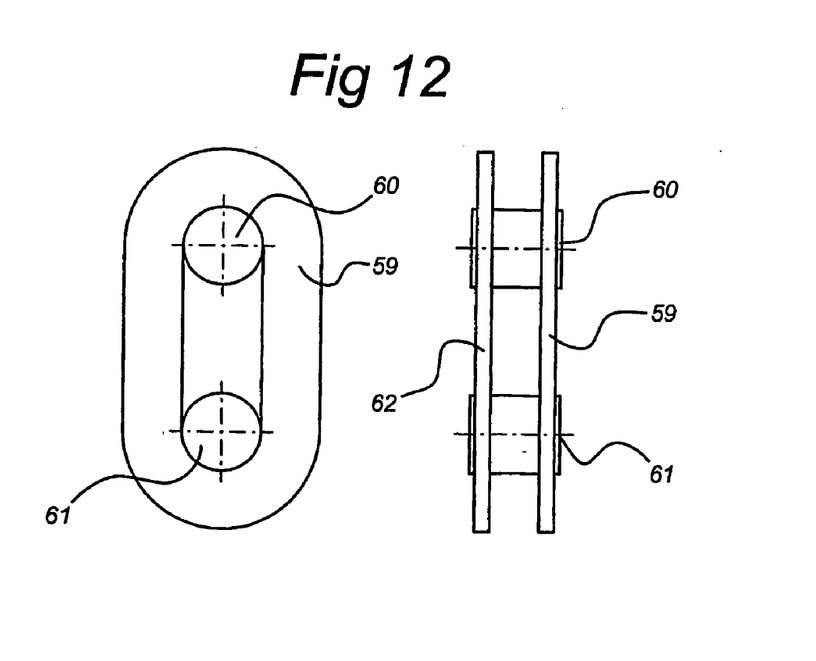
FIG. 12 shows a plan frontal view and side view of a shackle for interconnecting two line sections according to the present invention.

In the embodiment of FIG. 12, a flat shackle connection is shown wherein connector pins 60, 61 connect parallel shackle plates 59, 62. In this case, the shackle connector in FIG. 12 engages directly with the clamping construction of lifting structures 13, 14.

Figure 13:
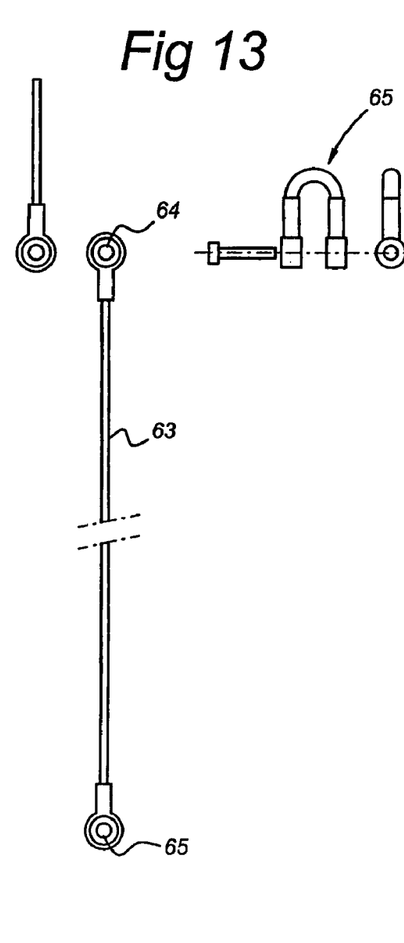
FIGS. 13 and 14 show alternative embodiments of interconnecting two synthetic line sections.
Figure 14:
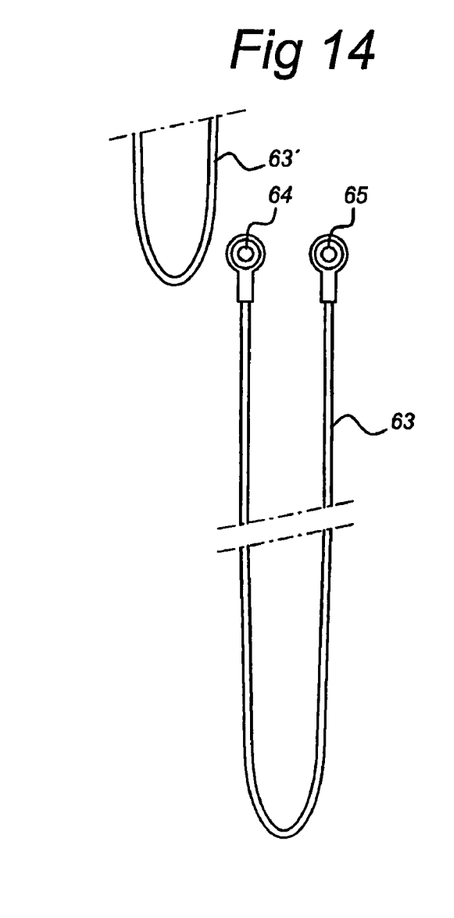

FIG. 13 shows cable sections 63 having at each end a socket or splice 64, 65. The sockets of adjacent cable sections can be interconnected to a cable string connector 5 such as shackle 65. In FIG. 14, the cable sections 63 are looped such that the loop at the lower part of cable section 63 can be engaged with both collars 64, 65 of lower cable section 63 via shackle 65. In this case, a double cable strength is obtained.

Figure 15:
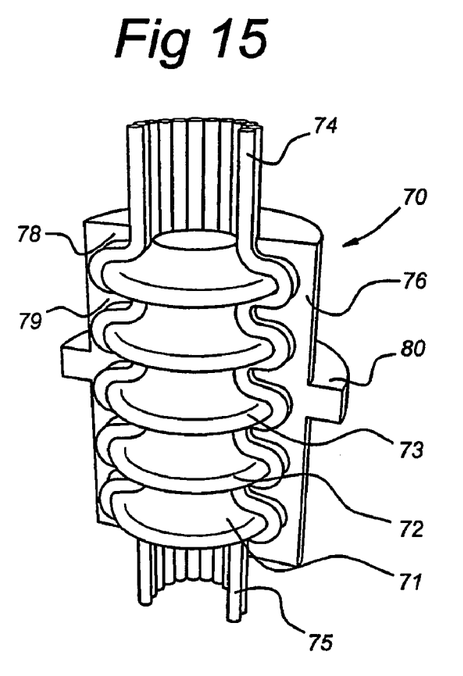
FIGS. 15 and 16 show an embodiment of a support member according to the present invention.
Figure 16:
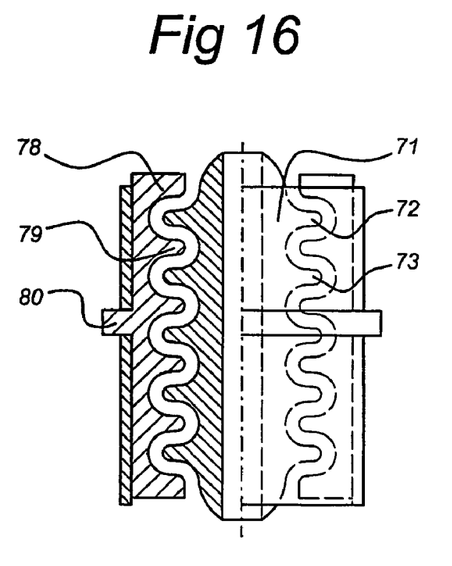

Finally, FIGS. 15 and 16 show a support member 70 in which a core 71 is used having spaced apart ribs 72, 73 along which strands 74 of cable 25 are guided. An outer sleeve 76 is placed around the core 71 having projections 78, 79 which engage in the space between the ribs 4 clamping the housing and core 71 in place by frictional engagement with strengths 74. A collar 80 is provided on the outer housing for engagement with lifting structures 13, 14.

By the use of synthetic cables, objects can be lifted from large water depths without the cable weight, which may have substantially neutral buoyancy, adding to the load. The cable length and cable strength can be easily adjusted to the prevailing water depth and weight of the load.

Figure 17:
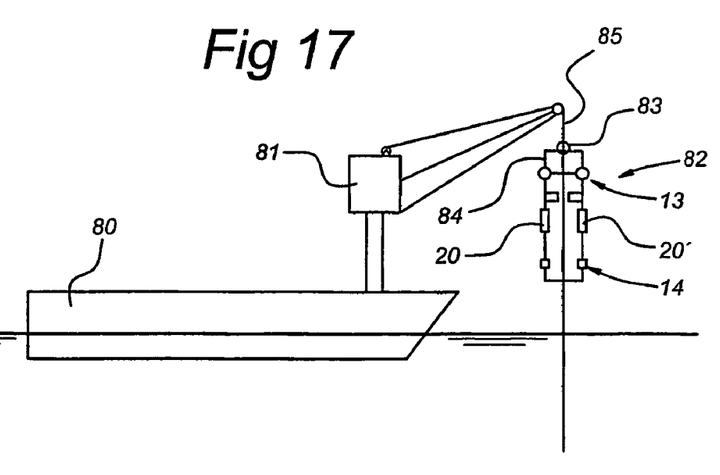
FIG. 17 shows a lifting assembly for deep water suspended from a crane.

Finally, FIG. 17 shows a vessel 80 having a crane 81, carrying a lifting assembly 82 according to the present invention. The lifting assembly 82 comprises a frame 84 having a connector (eye) 83 attached to the cable 85 of the crane 81. The frame 84 carries lifting structures 13, 14 including pulleys 25, 25', cylinders 20, 20' and the clamps 15, 15', 27, 27', such as shown in FIG. 2–4.

The crane 81 may use two cables, one attached to eye 83 and one attached to the movable lifting structure 13 for operating the movable lifting structure by the cable of the crane 81. In this way a standard crane can be made suitable for lifting and lowering heavy loads at large water depths, using the frame 84 and lifting cable 4 according to the present invention.

The invention claimed is:

1. Floating lifting device (2) comprising a cable (4) comprising synthetic cable strings with a number of support members (5, 6, 7) at spaced-apart locations along cable, a first (13) and a second (14) lifting structure, each structure having a releasable engagement member (15, 15', 27, 27') of a larger diameter than said cable diameter for engaging with the support members (5, 6, 7) on the cable (4) without clamping on the cable and for carrying the cable by the respective lifting structure, at least one lifting structure (13) being movable in the length direction of the cable between an upstream and a downstream position, the cable being lowered or raised by repeating steps a–d:
   a. moving the first lifting structure upstream or downstream, while the engagement member (27, 27') of the first structure (13) is closed on a support member and the engagement member (15, 15') of the second lifting structure (14) is opened, such that the cable (4) is suspended from the first lifting structure (13),
   b. closing the engagement member (15, 15') of the second lifting structure (14), on a support member and opening the engagement member (27, 27') of the first lifting structure (13), such that the elongate member (4) is supported from the second lifting structure (14), c. moving the first lifting structure (13) back towards or away from the second lifting structure (14), and d. closing the engagement member (27, 27') of the first lifting structure on another support member and opening the engagement member (15, 15') of the second lifting structure (14), wherein, the cable (4) is a flexible line comprising at an end part a connector (8) for releasably attaching objects to the end part of said line, the lifting device comprising a line storage member (10, 40) from which during carrying out steps a–d, the line (4) is supplied substantially without being tensioned.

2. Lifting device (2) according to claim 1, wherein the line storage member (10) comprises a compartment in which the line is stored in a looped configuration.

3. Lifting device (2) according to claim 1, the line being formed of a wire rope.

4. Lifting device (2) according to claim 3, the line comprising a number of strands (74), the support members (70) comprising an inner core (71) having along its length a number of circumferential ribs (72, 73), the strands being placed on the core and over the ribs, and an outer sleeve (76) enclosing the core, the sleeve having on an inner surface a number of projections (78, 79) that are complementary to the ribs on the core, the projections being received between the ribs of the core.

5. Lifting device (2) according to claim 1, the line being formed of a substantially neutral buoyant synthetic material.

6. Lifting device (2) according to claim 1, the first lifting structure (13) comprising two parallel rods (29, 29'), each rod telescopically received in a sleeve (23, 23) to be displaceable in the length direction of the line, a drive member (22) connected to the rods for displacing the rods in the length direction, a pulley (25, 25') being connected at the end of each rod (29, 29'), a movable clamp (27, 27') being placed on each rod, the opposed clamps (27, 27') of the rods forming part of the first lifting structure (13), the clamps being connected to a lifting cable (28, 28', 29, 29') running from each respective clamp (27, 27') along the rods (29, 29'), around the pulleys (25, 25') and downward along the rods to a point of fixation (31, 31').

7. Lifting device (2) according to claim 6, the clamps (27, 27') being slidable along the rods (29, 29') and along the sleeves (23, 23').

* * * * *